Patented Dec. 16, 1952

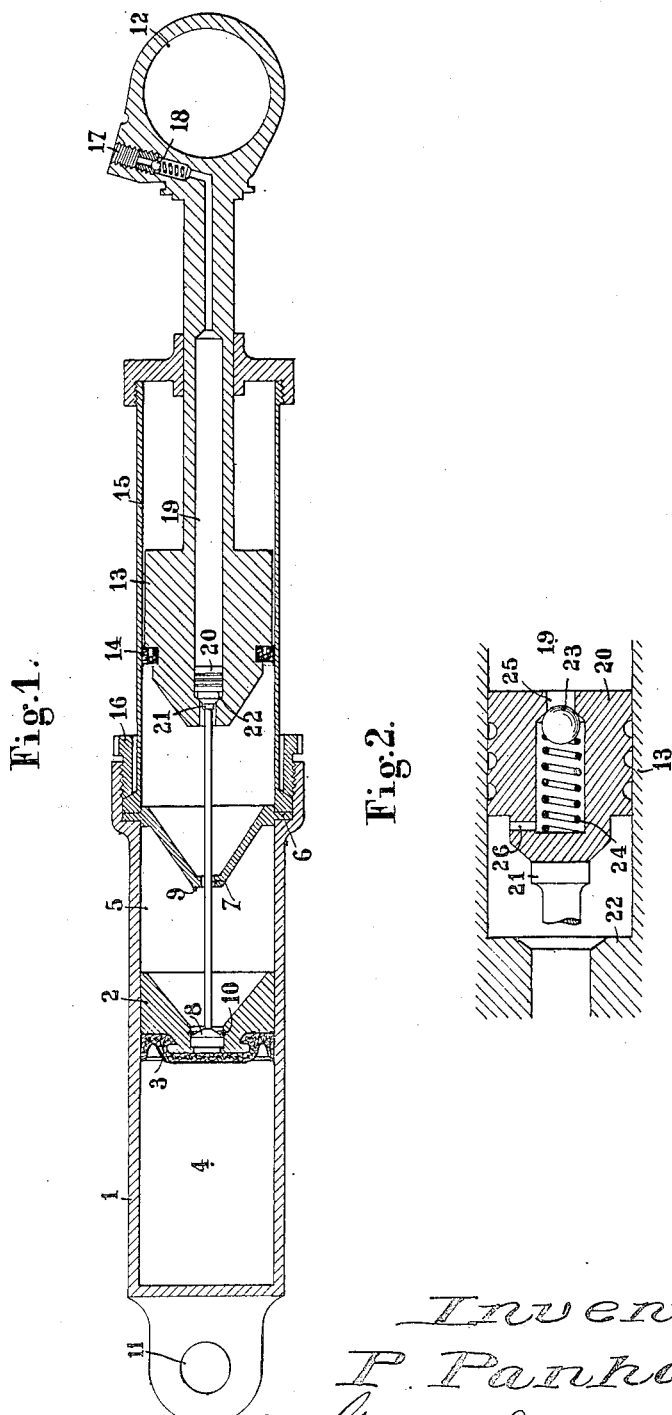

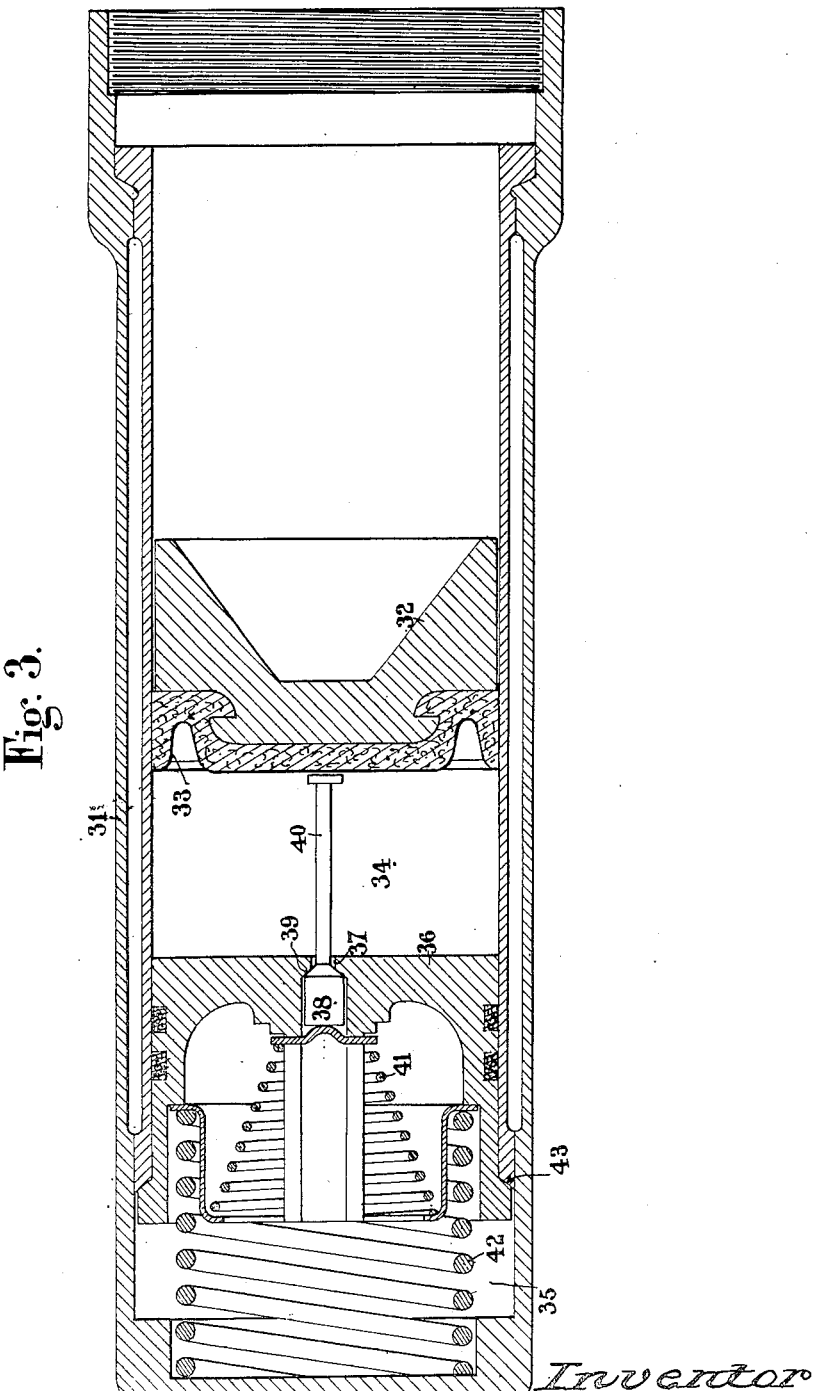

2,621,924

UNITED STATES PATENT OFFICE 2,621,924

HYDROPNEUMATIC SUSPENSION GEAR

Paul Panhard, Paris, France, assignor to Société Anonyme des Anciens Etablissements Panhard et Levassor, Paris, France Application August 19, 1948, Serial No. 45,158
In France August 30, 1947

6 Claims. (Cl. 267—64)

The present invention has for its object, in a hydropneumatic suspension gear:

1. To make the loss of even the least amount of the cushioning fluid impossible in all circumstances, even after a long time of service.
2. To allow without any trouble in the springing effect for a slight loss of the liquid intermediate between the parts to be suspended and the elastic cushioning fluid, said loss being offset automatically by the introduction of an equivalent amount of liquid under pressure.
3. To remedy said inconvenience and to modify the law of flexibility of the hydropneumatic suspension gear.

The invention consists in employing a pair of pistons, viz.: an idle piston and a working piston, which are maintained at an invariable distance from each other through a pressure liquid fluid orifice controlled by a rod carried by the idle piston.

In a particular embodiment the working piston and the rod of the same are formed with a bore that communicates with a source of fluid under pressure and said orifice can be closed by means of a piston housed in said bore and opened when said piston is moved clear of its seat by a rod rigid with the idle piston.

Said rod carried by the idle piston comprises a valve to which the pressure of the fluid of the suspension gear is transmitted.

A diaphragm is interposed within the cavity containing the fluid present between the working piston and the idle piston; said diaphragm is drilled with an orifice through which projects the rod of the idle piston, said orifice providing the seat for the valve.

The resiliency of the hydropneumatic spring gear is ensured by an elastic fluid enclosed in a cylinder and compressed by a piston to a greater or less degree depending on the load to which said spring gear is subjected.

The flexibility of the hydropneumatic spring gear varies according to a well defined law which is not always in accordance with the one desired. Effectively, the pressure of the elastic fluid varies in dependency on its volume and on the distance from the piston to the bottom of the cylinder. Taking as a basis the values of the pressure of the elastic fluid and of the flexibility when the piston is at its maximum distance from the bottom of the cylinder, the pressure of the elastic fluid will be approximately doubled and consequently the flexibility will be halved when the piston is positioned midway of its stroke; likewise, when the piston is positioned at the third quarter of its stroke the pressure of the fluid will be approximately four times higher than the basic value referred to while the flexibility will be four times less than its basic value.

In order to modify the law of flexibility according to the invention, a "double flexibility" or more generally a "multiple flexibility" arrangement is used which consists in dividing the cylinder containing the elastic fluid with the aid of at least one diaphragm provided with an orifice closed by a valve which is pressed against its seat when the piston is positioned in a definite region whereas it is lifted clear of its seat when the piston is positioned in another region.

According to a more particular feature of the invention the first of said regions is remote from the bottom of the cylinder and from the diaphragm whereas the second region is adjacent to the cylinder bottom and the diaphragm and the valve is lifted clear of its seat by the piston which moves in the cylinder containing the elastic fluid upon the packing of said piston engaging the end of the valve shank or stem; of course, said valve may be returned to its closed position by any suitable means in all piston positions consistant therewith.

According to a further feature of the invention each diaphragm may be movable in the cylinder that contains the elastic fluid in order that the stroke of the piston shall not be limited and decreased, and it may be moved towards the bottom of the cylinder by the piston itself; on the other hand said diaphragm is provided with return means, e. g. a spring, to urge it away from the cylinder bottom, and a stop is provided on the cylinder wall to limit this displacement.

The present invention will be described hereinafter, reference being had to the appended drawing in which:

Figure 1 is a longitudinal section of a spring gear according to the invention.

Figure 2 is an enlarged view of a detail.

Figure 3 is a sectional view of a modification.

A device according to the invention is illustrated diagrammatically in Fig. 1 in which I designates a cylinder that contains an idle piston 2 provided with a packing 3 and that is designed to separate the elastic fluid present in 4 from the intermediate liquid that fills the back chamber 5. A diaphragm 6 provided with an orifice 7 closes said cylinder I at its bottom end.

In these conditions it will be appreciated that with equal pressures prevailing at either side of the piston 2 the packing 3 is subjected to no pressure in operation.

Should the intermediate liquid happen to leak out, the idle piston 2 would move towards the diaphragm 6, thus keeping the pressures equal at either side of the piston until the latter comes into engagement with and is stopped by the diaphragm, after which the packing 3 only begins to be stressed yet without undergoing any displacement, which excludes any liability to wear as well as any possibility of leakage.

In order to make the joint still more reliable a small valve 8 is provided which can come into engagement with the seat 9 on diaphragm 6 and which can slide within the piston an amount which is limited by a wire spring 10. The pressure of the valve on its seat is given by the deformation of the packing 3 which transmits the pressure prevailing in the chamber 4 to said valve.

The slight displacement of the valve 8 ensures at all times a correct rest on the seat 9 even if small differences in shape should exist in the diaphragm 6 or the piston 2.

The question of automatic replenishment will now be dealt with.

The mechanical stresses are applied to the spring gear at 11 to the cylinder 1 and at 12 to the end of a rod which carries a working piston 13 provided with one or several packing rings 14. Said piston is movable within a casing 15 that provides an extension of cylinder 1 and is held in position by a nut 16 that provides a tight joint with the diaphragm 6 and also between diaphragm 6 and cylinder 1.

Provided on head 12 is an intake 17 for the liquid fluid under pressure, which intake includes a small valve 18 which makes it possible to use a fluid pressure which generally is equal to the mean pressure in the spring gear cylinder.

The rod of piston 13 has a duct 19 bored therethrough in which is slidably received a piston 20 (see Figs. 1 and 2); said piston 20 comes into engagement either with the end 21 of the stem of valve 8 or with a seat 22 on piston 13.

It will be appreciated easily that if some of the liquid fluid happens to leak out the two pistons 2 and 13 will move towards each other; the stem 21 of valve 8 thus engages the small piston 20 and moves it clear of its seat, whereby a definite amount of liquid fluid is allowed to flow in through the fluid intake 17 and the bore 19 until the pistons have moved a sufficient distance away from each other, whereby the stem 21 disengages piston 20 which finds again a rest on its seat 22, thus stopping the inflow of liquid.

The piston 20 carries a ball 23 pressed by a spring 24 in order to create a slight pressure difference between either side of the piston, which is sufficient to keep same permanently in engagement with the stem end 21; it thus becomes unnecessary to provide it with a spring the accommodation of which would be difficult in view of the long stroke necessary; the liquid fluid flows through the orifice 25, lifts the ball and passes through the holes 26 into an annular space provided between the seat and the portion slidably received in the bore 19.

Fig. 3 illustrates by way of example an embodiment of a double-flexibility hydropneumatic suspension gear comprising a diaphragm.

31 designates the cylinder containing the elastic fluid and 32 the piston which is movable in said cylinder. Said piston is provided with a packing 33.

Said cylinder is divided by a diaphragm 36 into two compartments 34 and 35 that contain the elastic fluid. Said diaphragm 36 is provided with an orifice 37 and with a valve 38 that can come into engagement with its seat formed by the margin of the orifice 37. The stem 40 of valve 38 can be moved axially by the packing 33 of the piston 32 when the latter is displaced towards the left as seen in the figure. The valve is urged towards its seat by a spring 41.

The diaphragm 36 is movable and slidably received in the cylinder 31. It is urged towards the right as seen in the figure by a spring 42 and its travel towards the right is limited by a stop 43.

As shown in the figure the piston 32 occupies the position corresponding to a change in flexibility, that is, assuming that the piston 32 is moving towards the bottom of the cylinder 31, the position in which the piston 32 engages the end of the stem 40.

When the piston moves from the said position illustrated in the figure towards the left of the figure the volume compressed corresponds to the sum of volumes 34 and 35.

When the piston moves towards the right the stem 40 disengages the packing 33 and the valve 38 comes into engagement with the seat 39, thus closing the chamber 34 completely.

The flexibility then corresponds only to the release of the pressure within chamber 34; it will be appreciated that with regard to the volumes 34 and 35 it is possible within wide limits to control the ratios of flexibility in either section of the stroke.

In the embodiment shown in the figure the stroke of piston 32 is longer than the length of the space 34; consequently, when said piston has been traveled over the whole length of space 34 it will engage the diaphragm 36 and drive it backwards over the desired length. Conversely, as the piston moves towards the right the diaphragm 36 which is loaded by the spring 42 engages the stop 43; however, the valve 38 remains lifted until the piston 32 is restored to the position shown in the figure.

What I claim as my invention and desire to secure by Letters Patent is:

1. A hydropneumatic suspension gear comprising a cylinder, an idle piston slidably received in said cylinder, an elastic fluid confined in the cylinder between the bottom of the cylinder and the idle piston, a working piston slidably received in the cylinder and bored with an axial passageway, a source of fluid under pressure communicating by the axial passageway of the working piston with the space of the cylinder between the idle piston and the working piston and filling said space by liquid, a small piston slidably received in the axial passageway of the working piston and closing said axial passageway when it is pushed in an operative position by the liquid of the source of liquid under pressure, and a stem secured at its one end to the idle piston and adapted at its opposite end to engage the small piston and retain said small piston back to the operative position upon the distance between the idle piston and the working piston becoming less than a predetermined value.

2. A hydropneumatic suspension gear comprising a cylinder, an idle piston slidably received in said cylinder, an elastic fluid confined in the cylinder between the bottom of the cylinder and the idle piston, a working piston slidably received in the cylinder and bored with an axial passageway, a source of liquid under pressure communicating by the axial passageway of the working piston with the space of the cylinder between the idle piston and the working piston and filling said space by liquid, a small piston slidably received in the axial passageway of the working piston and having one face turned towards the source of liquid under pressure and another face turned towards the space of the cylinder between the idle piston and the working piston and a spring loaded ball valve resisting liquid to pass from the one face to the other and moving the small piston towards said other face in an operative position closing the axial passageway of the working piston when liquid of the source of liquid under pressure is pushing on the spring loaded ball valve, and a stem secured at its one end to the idle piston and adapted at its opposite end to engage the small piston and retain said small piston back to the operative position upon the distance between the idle piston and the working piston becoming less than a predetermined value.

3. A hydropneumatic suspension gear according to claim 1, which comprises a diaphragm rigid with the cylinder and located between the idle piston and the working piston, said diaphragm being bored by a central aperture through which the stem projects, the idle piston coming into engagement with the diaphragm and closing the central aperture of said diaphragm upon the liquid within the idle piston and the diaphragm being completely expelled by the idle piston through the central aperture of the diaphragm.

4. A hydropneumatic suspension gear according to claim 1, which comprises a diaphragm rigid with the cylinder and located between the idle piston and the working piston, said diaphragm being bored by a central aperture through which the stem projects, a valve carried by one end of the stem, housed in the idle piston and closing the central aperture of the diaphragm upon the idle piston coming into engagement with the diaphragm.

5. A hydropneumatic suspension gear according to claim 1, which comprises a non-return valve seated between the source of liquid under pressure and the axial passageway of the working piston and preventing the liquid from flowing back to the source of liquid under pressure.

6. A hydropneumatic suspension gear comprising a cylinder, an idle piston slidably received in said cylinder, an elastic fluid confined in the cylinder between the bottom of the cylinder and the idle piston, a liquid confined in the cylinder and transmitting the reactions of the suspension to the idle piston on to the elastic fluid, a diaphragm perforated with a central orifice and slidably mounted in the cylinder between the bottom of the cylinder and the idle piston, a stop integral with the cylinder and limiting the travel of the diaphragm from the bottom of the cylinder, a valve located in the diaphragm, a spring bearing in the diaphragm and urging the valve towards the central orifice of the diaphragm, and a stem integral with the valve pushing the valve and opening the central orifice of the diaphragm when the idle piston becomes in engagement with said stem.

PAUL PANHARD.

REFERENCES CITED

The following references are of record in the file of this patent:

UNITED STATES PATENTS

| Number | Name | Date |
| --- | --- | --- |
| 1,146,335 | Liebau | July 13, 1915 |
| 1,261,011 | Cook | Apr. 2, 1918 |
| 2,361,575 | Thompson | Oct. 31, 1944 |